US008193270B2

(12) United States Patent
Marx et al.

(10) Patent No.: US 8,193,270 B2
(45) Date of Patent: Jun. 5, 2012

(54) METHOD OF MAKING COMPOSITES AND NANOCOMPOSITES

(75) Inventors: Ryan E. Marx, Cottage Grove, MN (US); James M. Nelson, Roseville, MN (US); Jeffrey J. Cernohous, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 817 days.

(21) Appl. No.: 11/011,538

(22) Filed: Dec. 14, 2004

(65) Prior Publication Data

US 2006/0128867 A1    Jun. 15, 2006

(51) Int. Cl.
  *C08K 3/34*        (2006.01)
(52) U.S. Cl. ........................ 524/445; 524/447
(58) Field of Classification Search .................. 524/186, 524/445, 447; 526/127
  See application file for complete search history.

(56) References Cited

U.S. PATENT DOCUMENTS

| | | | |
|---|---|---|---|
| 3,252,757 A | 5/1966 | Granquist |
| 3,666,407 A | 5/1972 | Orlemann |
| 3,671,190 A | 6/1972 | Neumann |
| 3,844,978 A | 10/1974 | Hickson |
| 3,844,979 A | 10/1974 | Hickson |
| 3,852,405 A | 12/1974 | Granquist |
| 3,855,147 A | 12/1974 | Granquist |
| 4,173,476 A | 11/1979 | Smith et al. |
| 4,318,766 A | 3/1982 | Smith |
| 4,378,277 A | 3/1983 | Smith |
| 4,469,639 A | 9/1984 | Thompson, III et al. |
| 4,820,778 A | 4/1989 | Ohtani et al. |
| 4,985,486 A | 1/1991 | Westeppe et al. |
| 5,028,351 A | 7/1991 | Kato et al. |
| 5,122,571 A | 6/1992 | Westeppe et al. |
| 5,206,284 A | 4/1993 | Fukui et al. |
| 5,225,496 A | 7/1993 | Yamamoto et al. |
| 5,244,970 A | 9/1993 | Kobayashi et al. |
| 5,338,802 A | 8/1994 | DuBois et al. |
| 5,374,688 A | 12/1994 | Besecke et al. |
| 5,514,734 A | 5/1996 | Maxfield et al. |
| 5,814,278 A | 9/1998 | Maistrovich et al. |
| 5,840,796 A | 11/1998 | Badesha et al. |
| 5,902,654 A | 5/1999 | Davidson et al. |
| 5,910,523 A | 6/1999 | Hudson |
| 5,939,184 A | 8/1999 | Inoue et al. |
| 6,036,765 A | 3/2000 | Farrow et al. |
| 6,060,549 A | 5/2000 | Li et al. |
| 6,160,054 A | 12/2000 | Schwindeman et al. |
| 6,184,338 B1 | 2/2001 | Schwindeman et al. |
| 6,197,891 B1 | 3/2001 | Schwindeman et al. |
| 6,221,991 B1 | 4/2001 | Letchford et al. |
| 6,339,121 B1 | 1/2002 | Rafailovich et al. |
| 6,379,791 B1 | 4/2002 | Cernohous et al. |
| 6,391,326 B1 | 5/2002 | Crepeau et al. |
| 6,395,386 B2 | 5/2002 | Bagrodia et al. |
| 6,407,155 B1 | 6/2002 | Qian et al. |
| 6,407,169 B1 | 6/2002 | Gauthier et al. |
| 6,448,353 B1 | 9/2002 | Nelson et al. |
| 6,462,122 B1 * | 10/2002 | Qian et al. .................... 524/445 |
| 6,521,678 B1 | 2/2003 | Chaiko |
| 6,541,557 B1 | 4/2003 | Hasegawa et al. |
| 6,579,927 B1 | 6/2003 | Fischer |
| 6,589,299 B2 | 7/2003 | Missling et al. |
| 6,630,239 B2 | 10/2003 | Cernohous et al. |
| 6,716,935 B1 | 4/2004 | Nelson et al. |
| 6,730,719 B2 | 5/2004 | Powell |
| 6,753,373 B2 | 6/2004 | Winowiecki |
| 6,767,951 B2 | 7/2004 | Nair et al. |
| 6,767,952 B2 | 7/2004 | Dontula et al. |
| 6,777,479 B1 | 8/2004 | Bernard et al. |
| 6,969,490 B2 | 11/2005 | Marx et al. |
| 6,969,491 B1 | 11/2005 | Marx et al. |
| 7,022,780 B2 | 4/2006 | Marx et al. |
| 7,393,907 B2 * | 7/2008 | Imuta et al. .................... 526/281 |
| 7,495,051 B2 | 2/2009 | Nelson et al. |
| 2002/0156207 A1 * | 10/2002 | Imuta et al. .................... 526/127 |
| 2003/0004250 A1 | 1/2003 | Ajbani et al. |
| 2003/0022963 A1 | 1/2003 | Parsons |
| 2003/0035756 A1 | 2/2003 | Nelson et al. |
| 2003/0093107 A1 | 5/2003 | Parsonage et al. |
| 2003/0100652 A1 | 5/2003 | Kim et al. |
| 2003/0100655 A1 | 5/2003 | Nair et al. |
| 2003/0114553 A1 | 6/2003 | Karim et al. |
| 2004/0023016 A1 | 2/2004 | Cernohous et al. |
| 2004/0023398 A1 | 2/2004 | Nelson et al. |
| 2004/0024130 A1 | 2/2004 | Nelson et al. |
| 2004/0059024 A1 | 3/2004 | Reinking et al. |
| 2004/0162379 A1 | 8/2004 | Ajbani et al. |

(Continued)

FOREIGN PATENT DOCUMENTS

EP      0 427 344       5/1991

(Continued)

OTHER PUBLICATIONS

Kesti R. et al J. Am. Chem. Soc. 1992, 114, pp. 9679-9680.*
Rachapudy et al., "Properties of Amorphous and Crystallizable Hydrocarbon Polymer. III. Studies of the Hydrogenation of Polybutadiene", Journal of Polymer Science: Polymer Physics Edition, vol. 17, (1979) pp. 1211-1222.
Hahn, "An Improved Method for the Diimide Hydrogenation of Butadiene and Isoprene Containing Polymers", Journal of Polymer Science Part A: Polymer Chemistry, vol. 30 (1992) pp. 397-408.
Barclay et al., "The 'Living' Free Radical Synthesis of Poly(4-hydroxystyrene): Physical Properties and Dissolution Behavior", Macromolecules, vol. 31 (1998), 1024-1031.
Eisenberg, et al, Ed., "Coulombic Interactions in Macromolecular Systems" ACS Symposium Series 302, American Chemical Society, (1986) pp. 79-83.

(Continued)

*Primary Examiner* — Vickey Nerangis
(74) *Attorney, Agent, or Firm* — Bradford B. Wright; Daniel R. Pastirik; C. Michael Geise

(57) ABSTRACT

A deprotectable polymer, activating agent, and layered silicate are combined and the deprotectable polymer is at least partially deprotected to form a composite. The composite may be combined with a polymeric resin to form a nanocomposite.

40 Claims, No Drawings

U.S. PATENT DOCUMENTS

| | | | |
|---|---|---|---|
| 2004/0183051 | A1 | 9/2004 | Wenzel et al. |
| 2004/0254268 | A1 | 12/2004 | Cernohous et al. |
| 2004/0265188 | A1 | 12/2004 | Marx et al. |
| 2005/0059765 | A1 | 3/2005 | Finch et al. |
| 2005/0256242 | A1 | 11/2005 | Ottaviani et al. |
| 2006/0047092 | A1 | 3/2006 | Marx et al. |
| 2006/0074167 | A1 | 4/2006 | Nelson et al. |
| 2006/0074169 | A1 | 4/2006 | Nelson et al. |

FOREIGN PATENT DOCUMENTS

| | | |
|---|---|---|
| EP | 0 479 031 A | 4/1992 |
| EP | 0 603 965 A2 | 6/1994 |
| EP | 1 217 030 | 6/2002 |
| EP | 1 310 528 | 5/2003 |
| EP | 1 384 750 | 1/2004 |
| EP | 1 518 893 A1 | 3/2005 |
| EP | 1 598 396 | 11/2005 |
| GB | 2314335 | 12/1997 |
| JP | 3-115114 A | 5/1991 |
| JP | 5-39392 A | 2/1993 |
| JP | 10-007418 A | 1/1998 |
| JP | 2000-204214 | 7/2000 |
| JP | 2002/167475 A | 6/2002 |
| JP | 2003-512276 A | 4/2003 |
| JP | 2004-99830 | 4/2004 |
| JP | 2004-196656 A | 7/2004 |
| JP | 2005/089758 A | 4/2005 |
| KR | 2002-0015406 | 2/2002 |
| KR | 2003-0017216 | 3/2002 |
| KR | 2002-0050493 | 6/2002 |
| WO | WO 88/02048 | 3/1988 |
| WO | WO 96/07522 | 3/1996 |
| WO | WO 96/07674 | 3/1996 |
| WO | WO 97/40929 | 11/1997 |
| WO | WO 99/07790 | 2/1999 |
| WO | WO 99/41060 | 8/1999 |
| WO | WO 99/41299 | 8/1999 |
| WO | WO 00/35969 * | 6/2000 |
| WO | 00/44825 A | 8/2000 |
| WO | WO 00/53672 | 9/2000 |
| WO | WO 00/78540 | 12/2000 |
| WO | WO 01/34685 | 5/2001 |
| WO | WO 01/58962 A1 | 8/2001 |
| WO | WO 02/068525 A1 | 9/2002 |
| WO | WO 02/094920 | 11/2002 |
| WO | WO 03/022935 A1 | 3/2003 |
| WO | WO 03/059817 | 7/2003 |
| WO | WO 2004/011508 | 2/2004 |
| WO | WO 2004/041878 | 5/2004 |
| WO | WO 2004/054021 | 6/2004 |
| WO | WO 2004/060849 | 7/2004 |
| WO | WO 2004/063260 | 7/2004 |
| WO | WO 2005/061623 | 7/2005 |

OTHER PUBLICATIONS

Green et al., "Protective Groups in Organic Synthesis", Second Edition, John Wiley & Sons, Inc. New York, (1991) pp. 41, 80-83.
Hsieh et al., "Anionic Polymerization Principles and Practical Applications", Marcel Dekker, Inc. (1996) pp. 71-127.
Hsieh et al., "Anionic Polymerization Principles and Practical Applications", Marcel Dekker, Inc. (1996) pp. 333-368.
Hsieh et al., "Anionic Polymerization Principles and Practical Applications", Marcel Dekker, Inc. (1996) pp. 641-684.
Hill, Jr. et al., "An Introduction to Chemical Engineering Kinetics & Reactor Design", John Wiley & Sons, New York (1977) pp. 251-252.
Marx et al., Stirred Tube Reactor and Method of Using the Same, U.S. Appl. No. 10/931,732, filed Sep. 1, 2004.
Nelson et al., "Method of Making a Composition and Nanocomposites Therefrom", U.S. Appl. No. 10/950,834, filed Sep. 27, 2004.
Declaration of Jeffrey J. Cernohous, dated Mar. 11, 2005.
Advincula et al., "Surface Initiated Polymerization (SIP) on Nanoparticle Surfaces: Demonstration of First Principles and Preparation of Nanocomposite Materials", Mat. Res. Soc. Cymp. Proc., (2001) vol. 676, pp. Y3.441-Y3.44.6.
Antipov et al., "Composition and Deformation Behaviour of Nanocomposits on the Base of Low Density Polyethylene and Modified Clays", High-molecular compositions, Series A (2003), vol. 45, No. 11, pp. 1874-1884 (English Translation Included).
ASTM D-1708-02a "Standard Test Method for Tensile Properties of Plastics by Use of Microtensile Specimens", Annual Book of ASTM Standards (2004), Section 8, vol. 08.01, pp. 394-398.
Chen, et al., "Synthesis of Epoxy and Block Oligomer Modified Clay Nanocomposite", Mat. Res. Soc. Sympl. Proc., (2002), vol. 703, pp. 547-550.
Chen et al., "Poly(styrene-block-isoprene) Nanocomposites: Kinetics of Intercalation and Effects of Copolymer on Intercalation Behaviors", Journal of Polymer Science: Part B: Polymer Physics (Dec. 15, 2003), vol. 41 No. 24, pp. 3264-3271.
Dortmans et al., "Reinforcement of a Porous PMMA Filter Material by Nanodispersed Clay", Advanced Engineering Materials (2001), vol. 3, No. 9, pp. 717-720.
Finnefrock et al., "The Plumber's Nightmare: A New Morphology in Block Copolymer—Ceramic Nanocomposites and Mesoporous Aluminosilicates", J. Am. Chem. Soc., (Oct. 29, 2003), vol. 125, No. 43, pp. 13084-13093.
Garcia-Leiner et al., "Melt intercalation in Polymer-Clay nanocomposites promoted by supercritical Carbon Dioxide", Polymeric Materials, Science & Engineering (Sep. 7-11, 2003), vol. 89, pp. 649-650.
Groenewold et al., "Elastic interactions and stability of clay-filled lamellar phases", Eur. Phys. J. E. (2001), vol. 5, pp. 171-182.
Hou et al., "Clay Intercalation of Poly(styrene-ethylene oxide) Block Copolymers Studied by Two-Dimensional Solid-State NMR", Macromolecules (2003), vol. 36, No. 8, pp. 2769-2776.
Jin et al., "Crystallization Behavior of Polyethylene Glycol Terephthalate/Polyethylene Glycol Intercalated Block Copolymers", Chemical Journal of Chinese Universities (May 2000), vol. 21, No. 5, pp. 801-804 (English Translation Included).
Lim et al, "Microstructure and Rheological Behavior of Block Copolymer/Clay Nanocomposites", Koren J. Chem. Eng. (2001), vol. 18(1), pp. 21-25.
Limary et al., "Stability of Diblock Copolymer/Layered Silicate Nanocomposite Thin Films", Macromolecules (2000), vol. 33, No. 14, pp. 5227-5234.
Lee et al., "Alignment and orientational proliferation of HEX cylinders in a polystyrene-block-polyisoprene-block-polystyrene copolymer in the presence of clays", Polymer (Mar. 2003), vol. 44, No. 5, pp. 1705-1710.
Lee et al., "Linear Dynamic Viscoelastic Properties of Functionalized Block Copolymer/Organoclay Nanocomposites", Macromolecules (2003), vol. 36, No. 3, pp. 804-815.
Mitchell et al., "Rheological Properties of Diblock Copolymer/Layered Silicate Nanocomposites", Journal of Polymer Science: Part B: Polymer Physics (2002), vol. 40, pp. 1434-1443.
Moreno et al., "Dielectric relaxation of poly(ethylenglycol-b-poly(propylenglycol)-b-poly-ethylenglycol) copolymers above the glass transition temperature", Eur. Phys. J. E. (2001), vol. 4, pp. 173-182.
Runt et al., "Modified Biomedical Poly(Urethane) Block Copolymers: Nanocomposites and Polyisobutylene Comb Polymers", Polymer Preprints (2001), vol. 42, No. 2, pp. 99-100.
Silva et al., "Templating of cylindrical and spherical block copolymer microdomains by layered silicates", Journal of Chemical Physics (Oct. 15, 2001), vol. 115, No. 15, pp. 7166-7174.
Wang et al., "Melt-Processable Syndioactic Polystyrene/Montmorillonite Nanocomposites", Journal of Polymer Science: Part B: Polymer Physics (Dec. 15, 2003), vol. 41, No. 24, pp. 3173-3187.
Wang, et al., "Poly(vinylidene fluoride-hexafluoropropylene)/organo-montmorillonite clays nanocomposite lithium polymer etectrolytes", Electrochimica Acta, vol. 49 (2004) pp. 3595-3602.
Wu et al., "Structural, Thermal, and Electrical Characterizaion of Layered Nanocomposites Derived from Na-Montmorillonite and Polyethers", Chem Mater., vol. 5, No. 6, (1993), pp. 835-838.
Zhang et al., "A novel property of styrene-butadiene-styrene/clay nanocomposites: radiation resistance", Journal of Materials Chemistry, vol. 14, pp. 209-213 (Published on Web Dec. 2, 2003).
Zhao et al., "Preparation of Poly(styrene-block-butyl acrylate) Block Copolymer-Silicate Nanocomposites", Chem. Mater. (Jul. 15, 2003), vol. 15, No. 14, pp. 2693-2695.

\* cited by examiner

METHOD OF MAKING COMPOSITES AND NANOCOMPOSITES

BACKGROUND

Polymeric materials that are reinforced with insoluble materials such as, for example, fibers or particulate materials are generally referred to as "polymer composites" or simply as "composites". In recent years, one type of composite termed a "nanocomposite" has come into widespread use. By definition, a nanocomposite has a reinforcing material that has one or more dimensions on the order of a nanometer. One type of nanocomposite has an exfoliated layered silicate as the reinforcing material wherein the layered structure is broken up and individual silicate platelets are dispersed throughout the polymeric resin.

Layered silicates are generally composed of stacked silicate platelets. The individual silicate platelets typically have a thickness on the order of about one nanometer and an aspect ratio of at least about 100. The spaces between the silicate platelets are called "gallery spaces". Under the proper conditions, the gallery spaces can be filled with a material such as, for example, a polymer. The material swells the layered silicate, increasing the distance between silicate platelets in a process termed "intercalation". If the layered silicate swells sufficiently such that at least some of the individual silicate platelets are no longer organized into stacks, those individual silicate platelets are said to be "exfoliated".

The degree to which a polymer will intercalate and/or exfoliate a particular layered silicate typically depends on the compatibility of the polymer with the layered silicate. For example, polymers having groups that are compatible with the layered silicates may intercalate and/or exfoliate layered silicates. On the other hand, some polymers such as, for example, non-polar polymers (e.g., polyethylene, polypropylene) may not readily intercalate or exfoliate layered silicates due to a lack of compatibility with the layered silicate.

SUMMARY

In one aspect the present invention provides a method of making a composite comprising:

combining components comprising a deprotectable polymer, an activating agent, and a layered silicate, wherein the deprotectable polymer has a backbone and a plurality of protected polar groups pendant from the backbone; and deprotecting at least one protected polar group to form a polar group having a hydrogen atom covalently bonded to an N, O, or S atom, or a salt thereof, thereby providing a deprotected polymer; and forming a composite, wherein the layered silicate is at least partially intercalated with the deprotected polymer, or the layered silicate is at least partially exfoliated, or both.

In some embodiments, the method further comprises polymerizing monomers comprising at least one monomer having a protected polar group to provide a deprotectable polymer.

In some embodiments, the method further comprises mixing the composite with a polymeric resin to provide a nanocomposite.

Methods according to the present invention are useful, for example, for making polymers that are sufficiently compatible with layered silicates that they can intercalate and/or exfoliate layered silicates. Such methods are particularly useful for forming nanocomposites from polymers such as, for example, poly(alpha-olefin) polymers that are produced by anionic polymerization under conditions wherein the presence of polar groups having a hydrogen atom covalently bonded to an N, O, or S atom would interfere with the polymerization.

As used herein, the terms "deprotectable" and "protected" as applied to groups are synonymous;

the term "deprotected polymer" refers to a polymer which has been at least partially deprotected to generate at least one polar group having a hydrogen atom covalently bonded to an N, O, or S atom;

the term "(meth)acryl" encompasses acryl and/or methacryl; and the term "pendant group" as applied to a polymer includes end groups.

DETAILED DESCRIPTION

Useful layered silicates include, for example, natural phyllosilicates, synthetic phyllosilicates, organically modified phyllosilicates (e.g., organoclays), and combinations thereof.

Examples of natural phyllosilicates include smectite and smectite-type clays such as montmorillonite, nontronite, bentonite, beidellite, hectorite, saponite, sauconite, fluorohectorite, stevensite, volkonskoite, magadiite, kenyaite, halloysite, hydrotalcite, and combinations thereof.

Examples of synthetic phyllosilicates include those prepared by hydrothermal processes as disclosed in U.S. Pat. No. 3,252,757 (Granquist); U.S. Pat. No. 3,666,407 (Orlemann); U.S. Pat. No. 3,671,190 (Neumann); U.S. Pat. No. 3,844,978 (Hickson); U.S. Pat. No. 3,844,979 (Hickson); U.S. Pat. No. 3,852,405 (Granquist); and U.S. Pat. No. 3,855,147 (Granquist). Many synthetic phyllosilicates are commercially available; for example, as marketed by Southern Clay Products, Inc., Gonzales, Tex., under the trade designation "LAPONITE". Examples include "LAPONITE B" (a synthetic layered fluorosilicate), "LAPONITE D" (a synthetic layered magnesium silicate), and "LAPONITE RD" (a synthetic layered silicate).

Organoclays are typically smectite or smectite-type clays produced by interacting a clay with one or more suitable intercalants. These intercalants are typically organic compounds, which may be neutral or ionic. Examples of neutral organic intercalants include polar compounds such as amides, esters, lactams, nitriles, ureas, carbonates, phosphates, phosphonates, sulfates, sulfonates, nitro compounds, and the like. Neutral organic intercalants can be monomeric, oligomeric, or polymeric, and may intercalate into the layers of the clay through hydrogen bonding without completely replacing the original charge balancing ions. Suitable ionic intercalants include cationic surfactants such as, for example, onium compounds such as ammonium (primary, secondary, tertiary, and quaternary), phosphonium, or sulfonium derivatives of aliphatic, aromatic or aliphatic amines, phosphines and sulfides. Onium compounds include, for example, quaternary ammonium ions having at least one long chain aliphatic group (e.g., octadecyl, myristyl, or oleyl) bound to the quaternary nitrogen atom. Further details concerning organoclays and methods for their preparation may be found, for example, in U.S. Pat. Nos. 4,469,639 (Thompson et al.); 6,036,765 (Farrow et al.); and 6,521,678 B1 (Chaiko).

A variety of organoclays are available from commercial sources. For example, Southern Clay Products offers various organoclays under the trade designations "CLOISITE" (derived from layered magnesium aluminum silicate) and "CLAYTONE" (derived from natural sodium bentonite) including "CLAYTONE HY", "CLAYTONE AF", "CLOISITE 6A" (modifier concentration of 140 meq/100 g), "CLOISITE 15A" (modifier concentration of 125 meq/100 g), and "CLOISITE 20A" (modifier concentration of 95 meq/100 g). Organoclays are also available commercially from Nanocor, Arlington Heights, Ill., for example, under the trade designation "NANOMER".

Typically, layered silicates exhibit a d-layer spacing that can be determined by well-known techniques such as X-ray diffraction (XRD) and/or transmission electron microscopy (TEM). According to the present invention, the d-layer spacing typically increases as intercalation between individual silicate layers by the deprotected polymer proceeds until the layers become so widely separated that they are considered exfoliated and no d-layer spacing is observable by XRD or TEM.

The deprotectable polymer has a backbone with pendant protected polar groups covalently bonded thereto. Upon deprotection, the protected polar groups form polar groups having a hydrogen atom bonded to an N, O, or S atom. For example, t-butyl esters may be deprotected in the presence of an acid catalyst to form the corresponding carboxylic acid and isobutene. Examples of polar groups having a hydrogen atom covalently bonded to an N, O, or S atom include —SH, —OH, —CO$_2$H, —NHOR, —NROH, —NHNHR, —SO$_2$H, —SO$_3$H, —OSO$_3$H, —OSO$_2$H, —PO$_3$H, —PO$_2$H, —C(=S)OH, —C(=O)NHR, and —SO$_2$NHR wherein R represents H or an optionally substituted alkyl, aryl, alkaryl, or aralkyl group. Of course there are many additional polar groups that have a hydrogen atom covalently bonded to an N, O, or S atom that may also be used. Salts (e.g., alkali metal salts, alkaline earth salts) of such polar groups may be readily obtained, for example, by reaction with a suitable base.

The protected polar groups may comprise, for example, deprotectable carboxyl groups, deprotectable sulfhydryl groups, deprotectable thiocarboxyl groups, deprotectable sulfonyl groups, deprotectable sulfenyl groups, deprotectable hydroxyl groups, deprotectable amino groups, deprotectable amido groups, or a combination thereof.

The deprotectable polymer may be prepared by any suitable method such as, for example, by protecting polar groups on a corresponding polymer. Typically, polar groups having one or more hydrogen atoms bonded to an N, O, or S atom may be converted to a deprotectable form (i.e., protected) by reaction with a suitable reagent that reacts with (i.e., protects) the polar group and converts it to a form without hydrogen atoms bonded to an N, O, or S atom, or a salt thereof. Subsequent deprotection regenerates the original polar group. Methods for protecting polar groups having one or more hydrogen atoms bonded to an N, O, or S atom, and deprotecting the corresponding protected polar groups, are widely known and are described, for example, by P. J. Kocienski in "Protecting Groups", 3rd ed., Stuttgart: Thieme, c2004 and by T. W. Greene and P. G. M. Wuts in "Protective groups in Organic Synthesis, 2nd ed., New York: Wiley-Interscience, c1991.

Examples of compounds having protected hydroxyl groups include: ethers such as, for example, tert-butyl ethers, benzyl ethers, p-methoxybenzyl ethers, 3,4-di-methoxybenzyl ethers, trityl ethers, allyl ethers, benzyl ethers, alkoxymethyl ethers, methoxymethyl ethers, 2-methoxyethoxymethyl ethers, benzyloxymethyl ethers, p-methoxybenzyloxymethyl ethers, silyl ethers (e.g., trimethylsilyl ethers, triethylsilyl ethers, tert-butyldimethylsilyl ethers, tert-butyldiphenylsilyl ethers, triisopropylsilyl ethers, diethylisopropylsilyl ethers, thexyldimethylsilyl ethers, triphenylsilyl ethers, di-tert-butylmethylsilyl ethers, and 2-(trimethylsilyl)ethoxymethyl ethers), tetrahydropyranyl ethers, and methylthiomethyl ethers; esters such as, for example, acetate esters, benzoate esters, pivalate esters, methoxyacetate esters, chloroacetate esters, and levulinate esters; and carbonates such as, for example, benzyl carbonates, p-nitrobenzyl carbonates, tert-butyl carbonates, 2,2,2-trichloroethyl carbonates, 2-(trimethylsilyl)ethyl carbonates, and allyl carbonates. Useful protecting groups for hydroxyl groups include, for example, t-butoxycarbonyloxy, t-butylcarbamato, and trialkylsiloxy groups. t-Butyl derivatives (e.g., t-butyl esters, t-butyl carbonates) are particularly useful in many cases as they generate a gaseous byproduct (isobutylene) that may typically be readily removed.

Examples of compounds having protected diol groups include O,O-acetals such as, for example, isopropylidene acetals, cyclopentylidene acetals, cyclohexylidene acetals, arylmethylene acetals, methylene acetals, and diphenylmethylene acetals; 1,2-diacetals such as, for example, cyclohexane-1,2-diacetals and butane-2,3-diacetals; and silylene derivatives such as, for example, 1,1,3,3-tetraisopropyldisiloxanylidene derivatives.

Examples of compounds having protected thiol groups include: thioethers such as, for example, tert-butyl thioethers, benzyl and substituted benzyl thioethers (e.g., trityl thioethers); 2-(trimethylsilyl)ethyl thioethers; 2-cyanoethyl thioethers; 9-fluorenylmethyl thioethers; and thiocarbonate derivatives.

Examples of compounds having protected carboxyl groups include: anhydrides such as, for example, $C_2$-$C_5$ alkanoic anhydride derivatives; esters such as, for example, methyl esters, tert-butyl esters, benzyl esters, allyl esters, phenacyl esters, alkoxyalkyl esters, esters, 2,2,2-trichloroethyl esters, 2-(trimethylsilyl)ethyl esters, 2-p-toluenesulfonylethyl esters, trialkylsilyl esters; and 2-substituted-1,3-oxazolines.

Examples of compounds having protected phosphate groups include: alkyl esters such as, for example, methyl esters, isopropyl esters, and tert-butyl esters; benzyl esters; allyl esters; p-hydroxyphenacyl esters; 2-cyanoethyl esters; 9-fluorenylmethyl esters; 2-(trimethylsilyl)ethyl esters; 2-(methylsulfonyl)ethyl esters; and 2,2,2-trichloroethyl esters.

Examples of compounds having protected amino groups include: imides and amides such as, for example, phthaloyl and tetrachlorophthaloyl imides, dithiasuccinyl imides, and trifluoroacetamides; carbamates such as, for example, methyl carbamates, ethyl carbamates, tert-butyl carbamates, benzyl carbamates, allyl carbamates, 9-fluorenylmethyl carbamates, 2-(trimethylsilyl)ethyl carbamates, and 2,2,2-trichloroethyl carbamates; sulfonyl derivatives such as, for example, arylsulfonamides (e.g., p-toluenesulfonamides); N-sulfenyl derivatives; N,O-acetals such as, for example, methoxymethylamines; triazinanones such as, for example, 1,3-dimethyl-1,3,5-triazinan-2-one; N-silyl derivatives such as, for example, N-trimethylsilylamine derivatives, 2,2,5,5,-tetramethyl-1-aza-2,5-disilacyclopentane derivatives; and imine and enamine derivatives such as, for example, N-bis(methylthio)methyleneimine and N-diphenylmethyleneamine.

More typically, the deprotectable polymer may be prepared by polymerizing one or more polymerizable monomers wherein at least one of the monomers has a protected polar group. There are many readily apparent synthetic methods of making polymerizable monomers having one or more protected polar groups such as those as described hereinabove. For example, a moiety having one or more protected polar groups may be attached to a polymerizable moiety. This technique is particularly useful for monomers wherein the polar group is incompatible with the polymerizable moiety. In another exemplary method, the polar group(s) of a polar group-containing polymerizable monomer (e.g., 2-hydroxyethyl (meth)acrylate) may be directly protected.

Examples of free-radically polymerizable monomers that have at least one protected polar group include: free-radically polymerizable monomers having protected carboxyl groups such as, for example, t-butyl or trialkylsilyl esters and tetrahydropyranyl esters of (meth)acrylic acid; free-radically polymerizable monomers having protected hydroxyl groups such as, for example, vinyl trifluoroacetate and silyl ethers, t-alkyl ethers, t-butyl carbonates, and t-butyl or alkoxyalkyl ethers of hydroxyalkyl (meth)acrylates; free-radically polymerizable monomers having protected amino groups such as, for example, t-butylcarbamatopropyl (meth)acrylate and N-vinyl-t-butyl carbamate; free-radically polymerizable monomers having protected amido groups such as, for example, N,N-bis(trimethylsilyl)(meth)acrylamide, N-alkyl-N-trimethylsilyl(meth)acrylamides, and related compounds; and free-radically polymerizable monomers having protected sulfhydryl groups such as, for example, include silyl thioethers, t-alkyl thioethers, and alkoxyalkyl thioethers derived from mercaptoalkyl(meth)acrylates.

Examples of anionically polymerizable monomers that have at least one protected polar group include: anionically polymerizable monomers having protected carboxyl groups such as, for example, t-butyl esters, trialkylsilyl esters, and tetrahydropyranyl esters of (meth)acrylic acid; anionically polymerizable monomers having protected hydroxyl groups, such as, for example, silyl ethers, t-alkyl ethers, and alkoxyalkyl ethers of hydroxyalkyl (meth)acrylates; anionically polymerizable monomers having protected amino groups such as, for example, t-butylcarbamatoalkyl (meth)acrylates and N-vinyl-t-butyl carbamate; anionically polymerizable monomers having protected amido groups such as, for example, N,N-bis(trialkylsilyl)(meth)acrylamides, N-alkyl-N-trialkylsilyl(meth)acrylamides, and related compounds; and anionically polymerizable monomers having protected sulfhydryl groups such as, for example, silyl thioethers, t-alkyl thioethers, and alkoxyalkyl thioethers of sulfhydrylalkyl (meth)acrylates.

Examples of cationically polymerizable monomers that have at least one protected polar group include: cationically polymerizable monomers having protected hydroxyl groups such as, for example, t-butyl, trialkylsilyl, and tetrahydropyranyl vinyl ethers; vinyl esters (e.g., vinyl benzoate); vinylene carbonate; and alkyl vinyl carbonates. Examples of cationically polymerizable monomers having protected sulfhydryl groups include: t-butyl, trialkylsilyl, and tetrahydropyranyl vinyl thioethers, vinyl thioesters (e.g., vinyl thiobenzoates), and alkyl vinyl thiocarbonates.

Although the deprotectable polymer may typically be prepared by polymerizing monomers comprising one or more deprotectable monomers, the deprotectable polymer may also be prepared by protecting pendant groups on a polymer such as, for example, a polymer having one or more pendant groups with a hydrogen atom bonded to an N, S, or O atom or a salt thereof.

Protected monomers may be homopolymerized or copolymerized with one or more additional monomers, including additional protected monomers. Examples of such additional monomers include alpha-olefins (e.g., ethylene, propylene), vinyl esters, vinyl ethers, aliphatic 1,3-dienes, styrenic monomers, (meth)acrylate monomers (e.g., C1-C8 alkyl (meth) acrylate esters), acrylonitrile, tetrafluoroethylene, hexafluoropropylene, vinylidene difluoride, cyclosiloxanes, epoxides, [n]-metallocenophanes, and combinations thereof.

Suitable polymerization methods include, for example, cationic, anionic, free radical, metathesis, and condensation polymerization methods, and combinations thereof. In many of these polymerization techniques inclusion of amino, hydroxy, or sulfhydryl group-containing monomers can lead to undesirable side reactions such as, for example, Michael addition, chain transfer, and/or termination. For example, in the case of anionic polymerization, it can be difficult or impossible to polymerize or copolymerize monomers having one or more hydrogen atoms bonded to an N, O, or S atom, since the polymerization is typically quenched by abstraction of the hydrogen atoms by the initiator and/or growing polymer.

Additional methods and equipment for making deprotectable polymers are described in, for example, U.S. Pat. Appl. Publ. No. 2004/0024130 A1 (Nelson et al.), the disclosure of which is incorporated herein by reference. For example, the deprotectable polymer may be synthesized in processes that are carried out in batch or semi-batch reactors; continuous stirred tank reactors; tubular reactors; stirred tubular reactors; plug flow reactors; temperature controlled stirred tubular reactors as described, for example, in U.S. Pat. App. Publ. Nos. 2004/0024130 A1 (Cernohous et al.) and 2003/0035756 A1 (Nelson et al.); static mixers; continuous loop reactors; extruders; shrouded extruders as described, for example, in U.S. Pat. No. 5,814,278 (Maistrovich et al.); and pouched reactors as described in PCT Publ. WO 96/07522 (Hamer et al.) and U.S. Pat. No. 5,902,654 (Davidson et al.). Polymerizations may take place in bulk, solution, suspension, emulsion, and/or in an ionic or supercritical fluid. Specific methods of making deprotectable polymer systems include atom transfer radical polymerization, reversible addition-fragmentation chain transfer polymerization, and nitroxyl or nitroxide (stable free radical or persistent radical) mediated polymerization.

Typically, the deprotectable polymer should be melt-processible, although this is not a requirement. For example, if the deprotectable polymer is soluble in a solvent, then the components may be combined in that solvent. The deprotectable polymer may have any form such as, for example, a linear or branched homopolymer, random copolymer, tapered or gradient copolymer, or block copolymer (e.g., diblock and triblock copolymers), including linear, comb, ladder, and star forms thereof, as long as it is not covalently crosslinked to form a three-dimensional polymeric network that is neither melt-processable nor solvent-soluble.

The deprotectable polymer may be free of hydrogen atoms covalently bonded to a heteroatom (e.g., N, S, O), however the deprotectable polymer may contain hydrogen atoms that are covalently bonded to a heteroatom.

Deprotection methods typically depend of the particular protecting group chosen, and may include, for example, acid or base catalyzed deprotection and/or hydrolysis of one or more protected polar groups. Such methods typically involve an activating agent such as, for example, water and/or an acid or base catalyst or an oxidizing or reducing agent. Whatever the specific chemical composition of the activating agent, it generally serves to increase the rate at which deprotection of the protected polar groups occurs. The nature of the activating agent may vary, for example, according to specific protected polar groups on the deprotectable polymer. Heat and/or light may also be used in combination with the activating agent. Deprotection of the protected polar groups may be followed by subsequent reaction. For example, acid catalyzed de-esterification or modification reaction of poly(meth)acrylic esters to form a polymethacrylic acid may be followed by a condensation reaction to form polymethacrylic anhydride, or a group exposed by a deprotection reaction may then be further reacted to form a derivative product, e.g., by grafting a moiety to the deprotected polar group.

In some embodiments, the activating agent may be a catalyst such as, for example, a Lewis acid or Lewis base, including Brønsted acids and Brønsted bases. As used herein, the terms: "Brønsted acid" refers to any molecular or ionic species that can act as a proton donor; "Lewis acid" refers to any molecular or ionic species that can act as an electron pair acceptor; "Brønsted base" refers to any molecular or ionic species that can act as a proton acceptor; and "Lewis base" refers to any molecular or ionic species that can act as an electron pair donor.

Examples of Lewis acids include $H^+$, any positively charged metal ion (e.g. $Ti^{3+}$, $Fe^{2+}$, $Ni^{2+}$, $Pt^{4+}$, $Na^+$, $K^+$), $BH_3$, $BF_3$, $BCl_3$, $AlCl_3$, and all Brønsted acids. Examples of Brønsted acids include mineral acids (e.g., sulfuric acid, hydrochloric acid, nitric acid, phosphoric acid, hydrobromic acid, and partially neutralized salts thereof), organic acids (e.g., formic acid, acetic acid, trifluoroacetic acid, trichloroacetic acid, toluenesulfonic acid, dichloroacetic acid, phenylphosphonic acid, ethylphosphinic acid, methanesulfonic acid, ethanesulfonic acid, 2-propanesulfonic acid, trifluoromethanesulfonic acid, benzenesulfonic acid, and para-toluenesulfonic acid), and combinations thereof.

In some embodiments, a Lewis acid catalyst may be produced in situ by exposing a suitable precursor material to actinic radiation as, for example, through a glass port on a melt extruder. Examples of such precursor materials include onium salts (e.g., diaryliodonium salts or triarylsulfonium salts) as described, for example, in U.S. Pat. No. 4,318,766 (Smith); U.S. Pat. No. 4,173,476 (Smith et al.); and U.S. Pat. No. 4,378,277 (Smith), the disclosures of which are incorporated herein by reference.

Examples of Lewis bases include $PF_3$; $PCl_3$; any negatively charged ion (e.g., $Br^-$, $Cl^-$, $F^-$, or $SO_2^{2-}$), and all Brønsted bases. Examples of Brønsted bases include $Br^-$; $Cl^-$; $F^-$; $OH^-$; $O_2CCO_2^{2-}$; $NH_3$; 1°, 2°, and 3° organic amines (including polyamines); phenoxide; and combinations thereof.

Typically, the activating agent should be well mixed with the deprotectable polymer and layered silicate in order to ensure rapid and/or uniform deprotection of the protected polar groups, although this is not a requirement.

The activating agent is typically combined with the layered silicate and deprotectable polymer in an amount effective to facilitate deprotection of at least some of the protected polar groups of the deprotectable polymer when the components are combined. For example, if the components are combined in a melt extruder, then the amount of activating agent is typically selected to provide the desired degree of deprotection of the deprotectable polymer during the residence time of the components in the extruder.

Generally, the activating agent is combined with the layered silicate and deprotectable polymer in an amount of from 0.001 to 10 parts by weight for every part by weight of the deprotectable polymer, although greater and lesser amounts may be used. More typically, the activating agent is combined with the layered silicate and deprotectable polymer in an amount of from 0.01 to 5 parts by weight for every part by weight of the deprotectable polymer.

The deprotectable polymer, layered silicate, and activating agent may be combined with one or more additional polymers (e.g., including additional deprotectable polymers) before or after at least partial deprotection of the deprotectable polymer and intercalation and/or exfoliation of the layered silicate. Accordingly, the mixture comprising deprotected polymer, intercalated and/or exfoliated layered silicate, and activating agent may comprise a masterbatch that is suitable for dilution in a single polymer or across a spectrum of polymeric materials. Such a masterbatch typically has a relatively high content of intercalated and/or exfoliated layered silicate. For example, the total amount of the intercalated silicate and exfoliated silicate platelets may comprise at least 30, 40, 50, 60 percent by weight or more of the composite. The composite may be let down into (i.e., combined with) a polymeric resin to form a nanocomposite.

The deprotectable polymer, activating agent, and a layered silicate may be combined in any order (including all at once). Typically, the components are combined contemporaneously, although in some cases it may be desirable to allow a period of time to elapse between addition of the various components (e.g., by combining the deprotectable polymer and the activating agent and allowing them to react to generate a deprotected polymer prior to combining them with the layered silicate and/or other optional components).

Typically, the deprotectable polymer, layered silicate, and activating agent are combined under high shear rate conditions (e.g., in a kneader or extruder), especially if no solvent is present. Optionally, the deprotectable polymer, layered silicate, and activating agent may be combined at an elevated or reduced temperature as compared to ambient temperature (e.g., at a temperature of from about 30° C. to about 160° C.). Elevated temperatures typically increase the rate of deprotection, facilitate mixing, and may aid in removal of volatile components, however elevated temperatures may also tend to increase degradation of polymeric components.

In embodiments such as, for example, those in which solvent is present with the deprotectable polymer, layered silicate, and activating agent it may be desirable to have vents attached to any mixing apparatus used to combine the deprotectable polymer, layered silicate, and activating agent. Such vents may be held at a reduced pressure to facilitate removal of volatile components. For example, one such procedure is described in U.S. patent application Ser. No. 10/950,834 (Nelson et al.), filed Sep. 27, 2004, the disclosure of which is incorporated herein by reference.

After removal of optional solvent, the resultant composite typically contains less than or equal to 5 percent by weight of solvent, based on the total weight of the composite. For example, the composite may contain less than or equal to 4, 3, 2, 1, or even less than 0.1 percent by weight of solvent, based on the total weight of the composite.

Depending on the degree of deprotection, the deprotected polymer typically at least partially intercalates and/or at least partially exfoliates the layered silicate. Generally, the greater the degree of deprotection, the greater will be the number of polar groups having N—H, O—H, and/or S—H bonds on the at least partially deprotected polymer, which in turn typically tends to increase the rate and/or degree of intercalation and/or exfoliation of the layered silicate. The rate and/or extent of intercalation and/or exfoliation may also be influenced by variables such as the presence of solvent, temperature, shear conditions, the chemical nature and/or concentration of the components (e.g., deprotectable polymer, layered silicate, and/or activating agent), degree of mixing, and duration of mixing.

Accordingly, the total amount of intercalated and/or exfoliated layered silicate may comprise at least 30, 40, 50, or even 60 or more percent by weight of the composite. Similarly, the layered silicate may be at least 30, 40, 50, 60, 70, 80, or even 90 percent exfoliated, or more.

Mixing of the composite with a polymeric resin may be accomplished by any suitable technique, typically depending on the nature of the polymeric resin. Such techniques include for example, extruding, stirring, and kneading, optionally in the presence of a solvent.

Composites formed according to the present invention may be combined with a fluid polymeric resin within the body of a screw extruder, whereupon it forms a fluid (e.g., molten) composite material that may be solidified (e.g., by cooling or curing) after extraction from the extruder. Typically, extruder temperatures may be in a range of from about 100° C. to about 180° C., although temperatures outside of this range may also be used.

While the composite and polymeric resin may be combined in sequential steps such as, for example, those described above, the polymeric resin, layered silicate, deprotectable polymer, and activating agent may also be combined and the layered silicate exfoliated in a single step. Such single step processes may be carried out using methods suitable for mixing the deprotectable polymer, activating agent, and layered silicate, for example, as described herein.

Any amount of the composite (e.g., masterbatch) may be let down into any amount of polymeric resin, for example, depending on the intended physical properties of the resultant nanocomposite. For example, the weight ratio of the polymeric resin to the weight ratio of the polymeric resin to the exfoliated silicate platelets is in a range of 20 to 200, inclusive.

Any organic polymeric resin may be used in practice of the present invention. For example, useful polymeric resins may be thermoplastic, thermosetting, or a combination thereof. Typically, methods according to the present invention are well suited for use with thermoplastic polymeric resins.

Useful thermoplastic polymeric resins include, for example: polylactones such as, for example, poly(pivalolactone) and poly(caprolactone); polyurethanes such as, for example, those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), or poly(2,2-(bis4-hydroxyphenyl) propane) carbonate; polysulfones; polyether ether ketones; polyamides such as, for example, poly(4-aminobutyric acid), poly(hexamethylene adipamide), poly(6-aminohexanoic acid), poly(m-xylylene adipamide), poly(p-xylylene sebacamide), poly(metaphenylene isophthalamide), and poly(p-phenylene terephthalamide); polyesters such as, for example, poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy benzoate), poly(1,4-cyclohexylidene dimethylene terephthalate) (cis), poly(1,4-cyclohexylidene dimethylene terephthalate) (trans), polyethylene terephthalate, and polybutylene terephthalate; poly(arylene oxides) such as, for example, poly(2,6-dimethyl-1,4-phenylene oxide) and poly(2,6-diphenyl-1,1-phenylene oxide); poly(arylene sulfides) such as, for example, polyphenylene sulfide; polyetherimides; vinyl polymers and their copolymers such as, for example, polyvinyl acetate, polyvinyl alcohol, polyvinyl chloride, polyvinyl butyral, polyvinylidene chloride, and ethylene-vinyl acetate copolymers; acrylic polymers such as, for example, poly(ethyl acrylate), poly(n-butyl acrylate), poly(methyl methacrylate), poly(ethyl methacrylate), poly(n-butyl methacrylate), poly(n-propyl methacrylate), polyacrylamide, polyacrylonitrile, polyacrylic acid, ethylene-ethyl acrylate copolymers, ethylene-acrylic acid copolymers; acrylonitrile copolymers (e.g., poly(acrylonitrile-co-butadiene-co-styrene) and poly(styrene-co-acrylonitrile)); styrenic polymers such as, for example, polystyrene, poly(styrene-co-maleic anhydride) polymers and their derivatives, methyl methacrylate-styrene copolymers, and methacrylated butadiene-styrene copolymers; polyolefins such as, for example, polyethylene, polybutylene, polypropylene, chlorinated low density polyethylene, poly(4-methyl-1-pentene); ionomers; poly(epichlorohydrins); polysulfones such as, for example, the reaction product of the sodium salt of 2,2-bis(4-hydroxyphenyl) propane and 4,4'-dichlorodiphenyl sulfone; furan resins such as, for example, poly(furan); cellulose ester plastics such as, for example, cellulose acetate, cellulose acetate butyrate, and cellulose propionate; protein plastics; polyarylene ethers such as, for example, polyphenylene oxide; polyimides; polyvinylidene halides; polycarbonates; aromatic polyketones; polyacetals; polysulfonates; polyester ionomers; and polyolefin ionomers. Copolymers and/or combinations of these aforementioned polymers can also be used.

Useful elastomeric polymeric resins (i.e., elastomers) include thermoplastic and thermoset elastomeric polymeric resins such as, for example, polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers.

Useful thermoplastic elastomeric polymer resins include block copolymers, made up of blocks of glassy or crystalline blocks such as polystyrene, poly(vinyltoluene), poly(t-butyl-styrene), and polyester, and the elastomeric blocks such as polybutadiene, polyisoprene, ethylene-propylene copolymers, ethylene-butylene copolymers, polyether ester and the like as, for example, poly(styrene-butadiene-styrene) block copolymers marketed by Shell Chemical Company, Houston, Tex., under the trade designation "KRATON". Copolymers and/or mixtures of these aforementioned elastomeric polymeric resins can also be used Useful polymeric resins also include fluoropolymers, that is, at least partially fluorinated polymers. Useful fluoropolymers include, for example, those that are preparable (e.g., by free-radical polymerization) from monomers comprising chlorotrifluoroethylene, 2-chloropentafluoropropene, 3-chloropentafluoropropene, vinylidene fluoride, trifluoroethylene, tetrafluoroethylene, 1-hydropentafluoropropene, 2-hydropentafluoropropene, 1,1-dichlorofluoroethylene, dichlorodifluoroethylene, hexafluoropropylene, vinyl fluoride, a perfluorinated vinyl ether (e.g., a perfluoro(alkoxy vinyl ether) such as $CF_3OCF_2CF_2CF_2OCF=CF_2$, or a perfluoro(alkyl vinyl ether) such as perfluoro(methyl vinyl ether) or perfluoro(propyl vinyl ether)), cure site monomers such as for example nitrile containing monomers (e.g., $CF_2=CFO(CF_2)_LCN$, $CF_2=CFO[CF_2CF(CF_3)O]_q(CF_2O)_yCF(CF_3)CN$, $CF_2=CF[OCF_2CF(CF_3)]_rO(CF_2)_tCN$, or $CF_2=CFO(CF_2)_uOCF(CF_3)CN$ where L=2-12; q=0-4; r=1-2; y=0-6;

t=1-4; and u=2-6), bromine containing monomers (e.g., Z-R$_f$—O$_x$—CF=CF$_2$ wherein Z is Br or I, R$_f$ is a substituted or unsubstituted C$_1$-C$_{12}$ fluoroalkylene, which may be perfluorinated and may contain one or more ether oxygen atoms, and x is 0 or 1); or a combination thereof, optionally in combination with additional non-fluorinated monomers such as, for example, ethylene or propylene. Specific examples of such fluoropolymers include polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers (e.g., tetrafluoroethylene-perfluoro(propyl vinyl ether)); and combinations thereof.

Useful commercially available thermoplastic fluoropolymers include, for example, those marketed by Dyneon LLC, Oakdale, Minn., under the trade designations "THV" (e.g., "THV 220", "THV 400G", "THV 500G", "THV 815", and "THV 610X"), "PVDF", "PFA", "HTE", "ETFE", and "FEP"; those marketed by Atofina Chemicals, Philadelphia, Pa., under the trade designation "KYNAR" (e.g., "KYNAR 740"); those marketed by Solvay Solexis, Thorofare, N.J., under the trade designations "HYLAR" (e.g., "HYLAR 700") and "HALAR ECTFE".

Useful thermosetting polymeric resins include, for example, epoxy resins, alkyd resins, acrylic resins, one-part and two-part urethane resins, cyanate resins, phenolic resins, aminoplast resins, and combinations thereof. If a thermosetting resin is used, a suitable curative for that resin (e.g., a thermal curative and/or photocurative) may also be included with the polymeric resin.

Optionally, the composite and/or nanocomposite may further contain one or more additives such as, for example, surfactants, flame proofing agents, fillers, ultraviolet absorbers, antioxidants, tackifier resins, colorants, fragrances, or antimicrobial agents.

Methods according to the present invention may be carried out in batch process or in a continuous manner.

Composites and nanocomposites prepared according to the present invention are dispersions, typically isotropic dispersions of intercalated and/or more typically exfoliated silicate platelets in the polymeric resin. The amount of exfoliated silicate platelets in composites and nanocomposites according to the present invention may be in any amount, but in the case of nanocomposites are typically in a range of from 0.1 to 10 percent by weight, more typically in a range of from 0.5 to 7 percent by weight, and even more typically in a range of from 1 to 5 percent by weight, inclusive, based on the total weight of the nanocomposite. Similarly, in some embodiments, the weight ratio of the exfoliated silicate platelets to the layered silicate in the composite or nanocomposite may be at least 1, 2, 3, 4, 5, 10, 50 or more, although lesser weight ratios may also be used.

While composites (including nanocomposites) according to the present invention are typically prepared and processed in a fluid state (e.g., as a melt or in optional solvent), they may also be utilized as solids; for example after cooling and/or after removing any optional solvent.

Polymeric resin in the nanocomposite may be solidified or hardened, for example, by cooling in the case of thermoplastic resins, or by at least partially curing in the case of thermosetting polymeric resins.

Compositions prepared according to the present invention are useful, for example, in the manufacture of barrier films or bottles, and flame retardant materials.

Methods of the present invention are particularly advantageous as used in conjunction with polymers synthesized using continuous stirred tube reactors such as, for example, those described in U.S. Pat. No. 6,448,353 B1 (Nelson et al.), and U.S. patent application Ser. No. 10/931,732 (Marx et al.), filed Sep. 1, 2004. For example, the polymer synthesis and mixing apparatuses may be set up in series so that the deprotectable polymer is fed directly into a mixing apparatus where it is combined with the layered silicate and activating agent.

Methods according to the present invention may be carried out in a discontinuous or in a continuous manner.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

| ABBREVIATION | DESCRIPTION |
|---|---|
| HCl | 0.1 N hydrochloric acid |
| LS1 | organically modified montmorillonite clay available under the trade designation "CLOISITE 20A" from Southern Clay Products (modified with methyl, tallow (~65% $C_{18}$; ~30% $C_{16}$; ~5% $C_{14}$), quaternary ammonium chloride; d-layer spacing = 2.42 nm. |
| LS2 | organically modified montmorillonite clay available under the trade designation "CLOISITE 30B" from Southern Clay Products (modified with methyl, tallow (~65% $C_{18}$; ~30% $C_{16}$; ~5% $C_{14}$), bis-2-hydroxyethyl, quaternary ammonium chloride); believed to have a d-layer spacing of 1.85 nm |
| LS3 | natural montmorillonite clay available under the trade designation "CLOISITE NA$^+$" from Southern Clay Products; believed to have a d-layer spacing of 1.17 nm. |
| LS4 | organically modified montmorillonite clay available under the trade designation "CLOISITE 93A" from Southern Clay Products (methyl, dihydrogenated tallow (~65% $C_{18}$; ~30% $C_{16}$; ~5% $C_{14}$) ternary ammonium sulfate); believed to have a d-layer spacing of 2.36 nm |
| P(I)-BPTMDSCP | an end-functional poly(isoprene) synthesized using a stirred tubular reactor process, generally as described in Example 10 of U.S. Pat. No. 6,448,353 (Nelson et al.) except that the "living" poly(isoprene) was terminated with 1-(3-bromopropyl)-2,2,5,5-tetramethyl-1-aza-2,5-disilacyclopentane instead of dimethylamino(dimethyl)chlorosilane; $M_n$ = 3.5 kg/mol, PDI = 1.7. |
| P(I)-DVB-tBDMS | a starbranched/hyperbranched t-butyldimethylsilyloxy end-functional poly(isoprene) synthesized using a stirred tubular reactor process, generally as described in Example 9 of U.S. Pat. No. 6,448,353 (Nelson et al.), except that isoprene was used in the place of styrene, tetrahydrofuran was used as a cosolvent, and -(t-butyldimethylsilyloxy)-1-propyllithium was used as the initiator in the place of sec-butyllithium; $M_n$ = 5.8 kg/mole; PDI = 2.3 |
| P(S-MAn) | poly(styrene-methacrylic acid-co-anhydride) synthesized from P(S-tBMA) according to the procedure of Example 1. |

-continued

| ABBREVIATION | DESCRIPTION |
|---|---|
| P(S-t-BMA) | a diblock copolymer, poly(styrene-block-t-butyl methacrylate), synthesized using a stirred tubular reactor process generally as described in Example 6 of U.S. Pat. No. 6,448,353 (Nelson et al.), the disclosure of which is incorporated herein by reference; $M_n$ = 120 kg/mole; PDI = 1.45; 95/5 weight ratio of styrene to t-butyl methacrylate monomeric units. |
| P(t-BMA-MeFBSEMA) | a diblock copolymer, poly[t-butyl methacrylate-block-2-(N-methylperfluorobutanesulfonamido)ethyl methacrylate]; synthesized using a stirred tubular reactor process, generally as described in Example 4 of U.S. Pat. Appl. Publ. 2004/0023016 (Cernohous et al.), the disclosure of which is incorporated herein by reference; $M_n$ = 65 kg/mole; PDI = 1.7; 80/20 weight ratio of t-butyl methacrylate to 2-(N-methylperfluorobutanesulfonamido)-ethyl methacrylate monomeric units. |
| PS | polystyrene, available under the trade designation "STYRON 615APR" from Dow Chemical Co., Midland, Michigan. |
| PTSA | p-toluenesulfonic acid monohydrate |
| TBAF | 1.0 M solution of tetrabutylammonium fluoride in tetrahydrofuran |
| THF | tetrahydrofuran |

Test Methods

Molecular Weight and Polydispersity

Average molecular weight and polydispersity were determined by Gel Permeation Chromatography (GPC) analysis. Approximately 25 milligrams (mg) of sample were dissolved in 10 milliliters (mL) of tetrahydrofuran (THF) to form a mixture. The mixture was filtered using a 0.2-micrometer pore size polytetrafluoroethylene syringe filter. Then, about 150 microliters of the filtered solution were injected into a gel-packed column, 25 cm long by 1 cm diameter, available under the trade designation "PLGEL-MIXED B" from PolymerLabs, Amherst, Mass., and that was part of a GPC system equipped with an autosampler and a pump. The GPC was system operated at room temperature using THF eluent that moved at a flow rate of approximately 0.95 mL/minute. A refractive index detector was used to detect changes in concentration. Number average molecular weight ($M_n$) and polydispersity index (PDI) calculations were calibrated using narrow polydispersity polystyrene controls ranging in molecular weight from $7.5 \times 10^6$ to 580 g/mole. The actual calculations were made with software (available under the trade designation "CALIBER" from Polymer Labs).

NMR Spectroscopy

The relative concentration of each block and confirmation of elimination or rearrangement was determined by $^1$H Nuclear Magnetic Resonance (NMR) spectroscopy analysis. Specimens were dissolved in deuterated chloroform at a concentration of about 10 percent by weight and placed in a 500 MHz $^1$H NMR Spectrometer available under the trade designation "UNITY 500 MHz NMR SPECTROMETER" from Varian, Inc., Palo Alto, Calif. Block concentrations were calculated from relative areas of characteristic block component spectra.

$^{29}$Si magic angle spinning ($^{29}$Si MAS) NMR analyses were performed using a 400 MHz wide bore NMR spectrometer available under the trade designation "INOVA NMR spectrometer" from Varian, Inc.

X-Ray Diffraction (XRD)

Reflection geometry X-ray scattering data were collected using a four-circle diffractometer (available under the trade designation "HUBER (424/511.1)" from Huber Diffraktionstechnik GmbH, D83253 Rimsting, Germany), copper K-alpha radiation, and scintillation detector registry of the scattered radiation. The incident beam was collimated to a circular aperture of 0.70 millimeters. Scans were conducted in a reflection geometry from 0.5 to 10 degrees (2 theta) using a 0.05 degree step size and 10 second dwell time. A sealed tube X-ray source and X-ray generator settings of 40 kilovolts and 20 milliamperes were used. Data analysis and peak position definition were determined using X-ray diffraction analysis software available under the trade designation "JADE" from MDI, Inc., Livermore, Calif.

Infrared Spectroscopy

Infrared spectra were recorded using a Fourier transform infrared spectrometer (available under the trade designation "NICOLET MAGNA 750 FOURIER TRANSFORM INFRARED SPECTROMETER", Thermo Electron Corp., Waltham, Mass.) in transmission mode on thin shavings from each sample. The complicated carbonyl region of each spectrum was deconvoluted using the facilities in the spectroscopy software suite available under the trade designation "GRAMS" from Thermo Electron Corporation.

General Procedure for Masterbatch Preparation

Masterbatch preparation is accomplished using a high viscosity processor (HVP) available under the trade designation "LIST DISCOTHERM B6 HIGH VISCOSITY PROCESSOR" from List AG, Acton, Mass. The HVP has a horizontal, cylindrical body with a concentric agitator shaft. Mounted on the shaft (and extending perpendicular to the shaft) are disk elements having angled peripheral mixing-kneading bars and stationary hook-shaped bars mounted on the inside of the housing that interact with and clean the shaft and disk elements as they rotate. The HVP has a twin-screw discharge for material removal. The total volume of the HVP is 17.5 L, with a working volume of 12 L. The housing, shaft, and disk elements are all heated via a hot oil heating system. The heat transfer area in the reactor is 0.67 m$^2$. Temperature is controlled and monitored in three locations within the HVP: (1) the reactor entrance zone (zone 1), (2) the reactor intermediate zone (zone 2) and (3) the reactor exit zone (zone 3). A variable speed motor drives the agitator shaft at a maximum torque of 1200 Nm. A vacuum pump is attached to the reactor at the top of zone 2 for vapor removal.

General Procedure for Continuous Twin-Screw Extrusion

Twin-screw extrusion is carried out using a co-rotating 25-mm twin-screw extruder (TSE) with 41:1 L/D, available under the trade designation "COPERION ZSK-25 WORLD LAB EXTRUDER" from Coperion Corp., Ramsey, N.J. Barrel zones for the extruder are 4D (100 mm) in length. The extruder is run at 320° F. (160° C.) with a screw speed of 300 rpm in all examples.

The TSE has a kneading section in barrel zone 4 for incorporating LS1 and/or P(S-VP) into molten PS resin after their addition to the extruder in barrel zone 3. This kneading section is 3 D in length, incorporating high- and medium-shear-intensity forwarding kneading elements for dispersive mixing and a low shear-intensity, reversing kneading element for generating a melt seal and distributive mixing. A small atmospheric vent, 1 D in length, at the beginning of barrel zone 5 is used to vent any entrapped air from the powder addition in barrel zone 3. Three downstream mixing sections are incorporated to add shear energy for dispersive and distributive mixing. A 3.5 D mixing section spanned barrel zones 5 and 6, a 2.5 D mixing section is employed in barrel zone 7, and a 3 D mixing section spans barrel zones 8 and 9. In all cases, medium- to low-shear-intensity, forwarding kneading elements and narrow-paddled, low-shear-intensity, reversing kneading elements are utilized to yield appropriate dispersive and distributive mixing. A vacuum of 52 torr (6.9 kPa) is pulled on a 2 D (50 mm) vacuum vent in barrel zone 9 to remove any volatiles. In order to achieve thermal homogeneity and additional distributive mixing, a gear-type mixing element, available under the trade designation "ZME" from Coperion Corp. is utilized downstream of the vacuum vent. The temperature of the melt stream is monitored and recorded over the kneading sections in barrel zones 4 and 6, respectively, by immersion-depth thermocouples. Continuous extrusion of molten resin into zone 1 of the TSE is accomplished by a 1.25-inch (3.12-cm) single screw extruder (SSE) (available under the trade designation "KILLION KTS-125 SINGLE-SCREW EXTRUDER" from Davis-Standard; Pawcatuck, Conn.), equipped with a 3.0:1 compression general-purpose screw with 24 flights. Feeding of LS1 and/or P(S-VP) into a 2 D (50 mm) port open to the atmosphere in barrel zone 3 of the twin-screw extruder is accomplished using a gravimetric feeder equipped with twin auger screws, available under the trade designation "K-TRON GRAVIMETRIC FEEDER, MODEL KCLKT20" from K-Tron International, Pitman, N.J. The extrudate from the TSE is metered through a 10.3 mL/revolution gear pump available under the trade designation "NORMAG" from Dynisco Extrusion, Hickory, N.C., and extruded through a ½-inch (1.3-cm) diameter pipe to form a strand. The strand is cooled at 8° C. in a water bath and pelletized.

Examples 1-2

XRD analysis of LS1 as purchased showed a d-layer spacing of 2.42 nanometers (nm). Feed solutions were made with varying amounts of LS1 and P(S-t-BMA) in THF (as reported in Table 1) by dissolving the P(S-t-BMA) in THF and then adding the LS1.

Each P(S-t-BMA)/LS1 feed solution was fed via a gear pump to a high viscosity processor at 0.48 l/min as described in the General Procedure for Masterbatch Preparation. The HVP was heated at 178° C., and at a vacuum setting of 90 torr. The main agitator shaft was stirred at a rate of 63 rpm and the discharge screw was run at 155 rpm. Temperatures within the HVP were held constant for each example: Zone 1=132° C., Zone 2=182° C., and Zone 3=175° C.

The resultant P(S-MAn)/LS1 composites were analyzed by XRD to determine dispersion quality and by infrared spectroscopy to verify the synthesis of methacrylic acid and anhydride. Both composites were found to have a layered silicate with a d-layer spacing of 3.7 nm and showed second and third order diffraction patterns. Infrared analysis of the resultant composites showed the presence of acid and anhydride.

The 3:1 P(S-MAn)/LS1 masterbatch of Example 1 was then let down in PS according to the General Procedure for Continuous Twin-Screw Extrusion wherein: PS was melted and fed into the twin screw extruder via a single screw extruder at a rate of 5.4 kg/hr (12 lb/hr) and pelletized masterbatch was fed into zone 3 at a rate of 1.4 kg/hr (3 lb/hr). The resultant extrudate had a 80:15:5 weight ratio of PS:P(S-MAn):LS1. Throughput was 6.8 kg/hr (15 lb/hr). A portion of the extrudate was pressed into a film and analyzed via XRD, which showed the layered silicate in the extrudate had a d-layer spacing of 3.7 nm.

TABLE 1

| Example | Ratio of P(S-t-BMA) to LS1 | PS-t-BMA, kg | PTSA, g | LS1, kg | THF, kg | XRD d-Layer Spacing, nm |
|---|---|---|---|---|---|---|
| 1 | 3:1 | 9.70 | 97 | 3.23 | 48.9 | 3.7 |
| 2 | 1:1 | 3.00 | 30 | 3.00 | 41.6 | 3.7 |

Example 3

A Batch Vacuum Processor (BVP), obtained under the trade designation "MKD 0,6-H60 IKAVISC MEASURING KNEADER" from IKA Labortechnik Gmbh & Co. KG, D-79219 Staufen, Germany, was heated at 120° C. The BVP had a kneading trough that held 600 mL and had a working volume of 300 mL. The bottom of the trough was double-walled allowing the batch to be heated via a hot oil circulator. Kneading was accomplished with two kneading paddles fixed to the motor that mixed both horizontally and vertically. The paddles continually wiped the walls and each other. In the lid of the BVP was a port from which a vacuum could be established and liquid could be introduced. A DC motor with a constant power output of 160 watts was mounted downstream from a gear assembly that was capable of transmitting a torque of 60 Nm to drive the paddles.

P(I)-DVB-tBDMS (100 g) was added to the bowl. This mixture was allowed to melt and then 100 g of LS1 was added to the bowl. The paddles were stirring at a rate of 63 rpm. The composite was allowed to mix for 30 minutes and an aliquot (Sample 3A) was taken. At this point, 1.0 g of PTSA was added to the mixture. The bowl was sealed and held at a vacuum level of 60 torr. The resultant composite was allowed to mix for an additional 30 minutes at 63 rpm. After 30 minutes, an aliquot (Sample 3B) was taken. XRD analysis was performed on Samples 3A and 3B. Sample 3A was determined to have a d-layer spacing of 2.9 nm and Sample 4B was determined to have a d-layer spacing of 3.3 nm. $^{29}$Si MAS NMR analysis was also performed on the composites from samples 3A and 3B and at least partial deprotection of the trialkylsilyl-protected hydroxyl group, t-butyl-Si(CH$_3$)$_2$—O—, was verified. Deprotection was verified by a decrease in the relative intensity of the resonance (+17.5 ppm) associated with protected end group from 11.7% (3A) to 10.9% (3B).

Comparative Examples A-B and Examples 4-5

Comparative Examples A-B and Examples 4-5 were prepared with compositions as reported in Table 2. P(I)-DVB-tBDMS and THF were mixed until the P(I)-DVB-tBDMS was completely dissolved. Layered silicate (LS2 or LS3) was then added to solution and allowed to mix on a shaker for 1 hour, until it was dispersed in the solution. If indicated, TBAF was added to the clay-containing solutions and this final solution was allowed to mix on a shaker for 24 hours. Aliquot samples of the resulting solution were extracted and the solvent was removed in a vacuum oven. Comparative Examples A-B and Examples 4-5 were analyzed via XRD and $^{29}$Si MAS NMR. Results of XRD analysis are reported in Table 2.

$^{29}$Si MAS NMR analysis verified that at least partial deprotection had occurred from Comparative Examples A-B and Examples 4-5 as judged by a decrease in the presence of the trialkylsilane protected hydroxyl group, t-butyl-Si(CH$_3$)$_2$—O—. The relative intensities of the $^{29}$Si MAS NMR resonance at +17.5 ppm associated with the trialkylsilane protected hydroxyl group are reported in Table 2 (below).

TABLE 2

| | P(I)-DVB-tBDMS, g | THF, g | TBAF, ml | LS2, g | LS3, g | XRD d-layer spacing, nm | Relative Intensity of Resonance at +17.5 ppm from $^{29}$Si MAS NMR, % |
|---|---|---|---|---|---|---|---|
| Comparative Example A | 50 | 300 | — | 50 | — | 1.5 | 8.5 |
| Example 4 | 50 | 300 | 40 | 50 | — | multiple phases with maxima at 2.0 nm and 4.0 nm | 3.5 |
| Comparative Example B | 50 | 300 | — | — | 50 | 1.1 | 6.2 |
| Example 5 | 50 | 30 | 40 | — | 50 | multiple phases with maxima at 1.7 nm and 3.2 nm | 5.6 |

Comparative Examples C-D and Examples 6-7

Comparative Examples C-D and Examples 6-7 were prepared with compositions as reported in Table 3. P(I)-BPTMDSCP and the solvents (THF and toluene) were mixed until the P(I)-BPTMDSCP was completely dissolved. Layered silicate (LS1 or LS4) was then added to solution and allowed to mix on a shaker for one hour, after which it was dispersed in the solution. If indicated, HCl was added to the clay-containing solutions and this final solution was allowed to mix on a shaker for 72 hours. Aliquot samples of the resulting solution were extracted and the solvent was removed in a vacuum oven.

Comparative Examples C-D and Examples 6-7 were analyzed via XRD and are reported in Table 3 (below).

TABLE 3

| | P(I)-BPTMDSCP, g | Toluene, g | THF, g | HCl, mL | LS1, g | LS4, g | XRD d-layer spacing, nm |
|---|---|---|---|---|---|---|---|
| Comparative Example C | 35 | 70 | 240 | — | 35 | — | 2.4 |
| Example 6 | 35 | 70 | 240 | 5 | 35 | — | 2.8 |
| Comparative Example D | 35 | 70 | 240 | — | — | 35 | 2.4 |
| Example 7 | 35 | 70 | 240 | 5 | — | 35 | 2.6 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a nanocomposite comprising:
combining components comprising a protected polymer, an activating agent, and a layered silicate, wherein the protected polymer has a backbone and a plurality of protected polar groups pendant from the backbone, wherein the protected polar groups comprise protected carboxyl groups; protected sulfhydryl groups, protected thiocarboxyl groups; protected sulfonyl groups; protected sulfenyl groups; protected amino groups; protected amido groups; protected hydroxyl groups selected from the group consisting of tert-butyl ethers, benzyl ethers, p-methoxybenzyl ethers, 3,4-di-methoxybenzyl ethers, trityl ethers, allyl ethers, benzyl ethers, alkoxymethyl ethers, methoxymethyl ethers, 2-methoxyethoxymethyl ethers, benzyloxymethyl ethers, p-methoxybenzyloxymethyl ethers, silyl ethers, tetrahydropyranyl ethers, methylthiomethyl ethers, esters, and carbonates; or a combination thereof; and
deprotecting at least one protected polar group of the protected polymer to form a polar group having a hydrogen atom covalently bonded to an N, O, or S atom or a salt thereof, thereby providing a deprotected polymer;
forming a composite, wherein the total amount of layered silicate comprises at least 30 percent by weight of the composite and wherein the layered silicate is at least partially intercalated with the deprotected polymer, or the layered silicate is at least partially exfoliated, or both; and
mixing the composite with a polymeric resin to provide a nanocomposite.

2. A method according to claim 1, wherein the layered silicate has a first d-layer spacing and the layered silicate that is at least partially intercalated with the deprotected polymer has a second d-layer spacing that is larger than the first d-layer spacing.

3. A method according to claim 1, wherein the deprotected polymer further reacts to form a derivative product.

4. A method according to claim 1, wherein the deprotected polymer further reacts to form an anhydride.

5. A method according to claim 1, wherein the activating agent comprises a catalyst.

6. A method according to claim 1, wherein the activating agent comprises a Brønsted acid.

7. A method according to claim 1, wherein the polar groups comprise at least one of hydroxyl, amino, or carboxyl groups.

8. A method according to claim 1, wherein deprotecting the protected polar groups generates a gas.

9. A method according to claim 1, wherein the protected polar groups comprise protected carboxyl groups, protected sulfhydryl groups, protected thiocarboxyl groups, protected sulfonyl groups, protected sulfenyl groups, protected hydroxyl groups, protected amino groups, protected amido groups, or a combination thereof.

10. A method according to claim 1, wherein the protected polar group comprises at least one of a t-butoxycarbonyloxy group, t-butylcarbamato group, or a trialkylsiloxy group.

11. A method according to claim 1, wherein the deprotectable polymer is preparable by polymerizing monomers comprising at least one monomer selected from the group consisting of alpha-olefins, vinyl esters, vinyl ethers, aliphatic 1,3-dienes, styrenic monomers, (meth)acrylate monomers, acrylonitrile, tetrafluoroethylene, hexafluoropropylene, vinylidene difluoride, cyclosiloxanes, epoxides, [n]-metallocenophanes, and combinations thereof.

12. A method according to claim 1, wherein the layered silicate comprises montmorillonite, nontronite, bentonite, beidellite, hectorite, saponite, sauconite, fluorohectorite, stevensite, volkonskoite, magadiite, kenyaite, halloysite, hydrotalcite, a synthetic layered silicate, organoclay, or a combination thereof.

13. A method according to claim 1, wherein the layered silicate is greater than 90 percent by weight exfoliated.

14. A method according to claim 1, wherein the composite contains less than or equal to 1 percent by weight of solvent, based on the total weight of the composite.

15. A method according to claim 1, wherein forming a composite comprises masticating the layered silicate and the at least partially deprotected polymer.

16. A method according to claim 1, wherein the total amount of intercalated silicate and exfoliated silicate platelets comprises at least 60 percent by weight of the composite.

17. A method according to claim 1, wherein the method is carried out in a continuous manner.

18. A method according to claim 1, wherein the layered silicate comprises an organoclay.

19. A method according to claim 1, wherein the polymeric resin comprises a thermoplastic resin.

20. A method according to claim 1, wherein the thermoplastic resin comprises a polyolefin, polyurethane, polyamide, fluoropolymer, polyimide, polycarbonate, polyester, polysulfone, polylactone, polyacetal, acrylonitrile copolymer, polyphenylene oxide, polyphenylene sulfide, polystyrene, aromatic polyketone, or a combination thereof.

21. A method according to claim 1, wherein the polymeric resin comprises a thermosetting resin.

22. A method according to claim 1, wherein the weight ratio of the polymeric resin to the exfoliated silicate platelets is in a range of 20 to 200, inclusive.

23. A method according to claim 1, wherein the exfoliated silicate platelets are contained in the nanocomposite in an amount of from 1 to 5 percent by weight, inclusive, based on the total weight of the nanocomposite.

24. A method of making a nanocomposite comprising:
combining components comprising a protected polymer, an activating agent comprising a Brønsted base, and a layered silicate, wherein the protected polymer has a backbone and a plurality of protected polar groups pendant from the backbone, wherein the protected polar groups comprise protected carboxyl groups; protected sulfhydryl groupsl protected thiocarboxyl groups; protected sulfonyl groups; protected sulfenyl groups; protected amino groups; protected amido groups; protected hydroxyl groups selected from the group consisting of tert-butyl ethers, benzyl ethers, p-methoxybenzyl ethers, 3,4-di-methoxybenzyl ethers, trityl ethers, allyl ethers, benzyl ethers, alkoxymethyl ethers, methoxymethyl ethers, 2-methoxyethoxymethyl ethers, benzyloxymethyl ethers, p-methoxybenzyloxymethyl ethers, silyl ethers, tetrahydropyranyl ethers, methylthiomethyl ethers, esters, and carbonates; or a combination thereof; and
deprotecting at least one protected polar group of the protected polymer to form a polar group having a hydrogen atom covalently bonded to an N, O, or S atom or a salt thereof, thereby providing a deprotected polymer;
forming a composite, wherein the total amount of layered silicate comprises at least 30 percent by weight of the composite and wherein the layered silicate is at least partially intercalated with the deprotected polymer, or the layered silicate is at least partially exfoliated, or both; and
mixing the composite with a polymeric resin to provide the nanocomposite.

25. A method according to claim 24, wherein the layered silicate has a first d-layer spacing and the layered silicate that is at least partially intercalated with the deprotected polymer has a second d-layer spacing that is larger than the first d-layer spacing.

26. A method according to claim 24, wherein the Brønsted base is selected the group consisting of from $Br^-$; $Cl^-$; $F^-$; $OH^-$; $O_2CCO_2^{2-}$; $NH_3$; primary organic amine; primary organic polyamine; secondary organic amine; secondary organic polyamine, tertiary organic amine; tertiary organic polyamine; phenoxide; and combinations thereof.

27. A method according to claim 24, wherein the deprotected polymer further reacts to form a derivative product.

28. A method according to claim 24, wherein the deprotected polymer further reacts to form an anhydride.

29. A method according to claim 24, wherein the polar group comprises at least one of hydroxyl, amino, or carboxyl groups.

30. A method according to claim 24, wherein deprotecting the protected polar groups generates a gas.

31. A method according to claim 24, wherein the protected polar groups comprise protected carboxyl groups, protected sulfhydryl groups, protected thiocarboxyl groups, protected sulfonyl groups, protected sulfenyl groups, protected hydroxyl groups, protected amino groups, protected amido groups, or a combination thereof.

32. A method according to claim 24, wherein the protected polar group comprises at least one of a t-butoxycarbonyloxy group, t-butylcarbamato group, or a trialkylsiloxy group.

33. A method according to claim 24, wherein the deprotectable polymer is preparable by polymerizing monomers comprising at least one monomer selected from the group consisting of alpha-olefins, vinyl esters, vinyl ethers, aliphatic 1,3-dienes, styrenic monomers, (meth)acrylate monomers, acrylonitrile, tetrafluoroethylene, hexafluoropropylene, vinylidene difluoride, cyclosiloxanes, epoxides, [n]-metallocenophanes, and combinations thereof.

34. A method according to claim 24, wherein the layered silicate comprises montmorillonite, nontronite, bentonite, beidellite, hectorite, saponite, sauconite, fluorohectorite, stevensite, volkonskoite, magadiite, kenyaite, halloysite, hydrotalcite, a synthetic layered silicate, organoclay, or a combination thereof.

35. A method according to claim 24, wherein the layered silicate is greater than 90 percent by weight exfoliated.

36. A method according to claim 24, wherein the composite contains less than or equal to 1 percent by weight of solvent, based on the total weight of the composite.

37. A method according to claim 24, wherein forming a composite comprises masticating the layered silicate and the at least partially deprotected polymer.

38. A method according to claim 24, wherein the total amount of intercalated silicate and exfoliated silicate platelets comprises at least 60 percent by weight of the composite.

39. A method according to claim 24, wherein the method is carried out in a continuous manner.

40. A method according to claim 24, wherein the layered silicate comprises an organoclay.

* * * * *

UNITED STATES PATENT AND TRADEMARK OFFICE
CERTIFICATE OF CORRECTION

PATENT NO. : 8,193,270 B2  
APPLICATION NO. : 11/011538  
DATED : June 5, 2012  
INVENTOR(S) : Ryan E. Marx et al.

It is certified that error appears in the above-identified patent and that said Letters Patent is hereby corrected as shown below:

Column 17
Line 58, in Claim 1, delete "groups," and insert -- groups; --, therefor.

Column 19
Line 59, in Claim 24, delete "groupsl" and insert -- groups; --, therefor.

Signed and Sealed this
Second Day of October, 2012

David J. Kappos
*Director of the United States Patent and Trademark Office*